(12) United States Patent
Petrucci et al.

(10) Patent No.: US 7,704,063 B2
(45) Date of Patent: Apr. 27, 2010

(54) PLASTIC INJECTION MOLD ASSEMBLY AND METHOD OF MOLDING THREADED PLASTIC PARTS

(76) Inventors: Alan A. Petrucci, 4113 Lawn Ave., Western Springs, IL (US) 60558; William Sigsworth, 3339 Surry Ridge Rd., Lisle, IL (US) 60532

( * ) Notice: Subject to any disclaimer, the term of this patent is extended or adjusted under 35 U.S.C. 154(b) by 0 days.

(21) Appl. No.: 11/820,910

(22) Filed: Jun. 21, 2007

(65) Prior Publication Data
US 2008/0038394 A1 Feb. 14, 2008

Related U.S. Application Data

(63) Continuation of application No. 10/375,745, filed on Feb. 28, 2003, now abandoned.

(51) Int. Cl.
*B29C 45/44* (2006.01)

(52) U.S. Cl. .................... 425/139; 425/556; 425/577

(58) Field of Classification Search ............... 425/556, 425/577, 139, DIG. 58; 700/200
See application file for complete search history.

(56) References Cited

U.S. PATENT DOCUMENTS

| | | | | |
|---|---|---|---|---|
| 4,958,676 A | * | 9/1990 | Kuntz | 164/340 |
| 5,234,337 A | * | 8/1993 | Hehl | 425/589 |
| 5,310,331 A | * | 5/1994 | Wakebe et al. | 425/139 |
| 5,776,521 A | * | 7/1998 | Wright et al. | 425/556 |

* cited by examiner

*Primary Examiner*—Yogendra N Gupta
*Assistant Examiner*—Emmanuel S Luk
(74) *Attorney, Agent, or Firm*—Gregory B. Beggs

(57) ABSTRACT

A plastic injection mold assembly is disclosed in which an electric servo motor very precisely controls rotational speeds and amounts of torque applied to cores which extend into the mold cavities as the cores are withdrawn from plastic components being molded and simultaneously directs the linear distances which the cores travel during such withdrawal. A method of accomplishing the molding of plastic components in this manner is also disclosed.

9 Claims, 13 Drawing Sheets

Fig. 1

PLASTIC INJECTION MOLD ASSEMBLY AND METHOD OF MOLDING THREADED PLASTIC PARTS

This application is a continuation of application Ser. No. 10/375,745 filed Feb. 28, 2003, now abandoned the entire contents of which is incorporated herein by reference.

This invention relates to plastic injection molds for producing internally and externally threaded components. More particularly, it relates to a mold assembly in which an electric motor very precisely controls the various rotational speeds and amounts of torque applied to cores which extend into the mold cavities as they are withdrawn from the plastic components being molded and simultaneously directs the linear distances which the cores travel during such withdrawal. A method of accomplishing the molding of plastic components in this manner is also disclosed.

BACKGROUND OF THE INVENTION

Heretofore, a variety of limitations have affected the molding of threaded plastic components. When a hydraulically powered rack was employed for extracting a metal core from a mold cavity, the number of threads which could be made on the inside or the outside of a component was limited because the number of threads was restricted by the number of rotations required for unscrewing the metal core from the component. The number of rotations which a core could make was dependent upon the space required around the mold to accommodate the length of the rack. Moreover, hydraulically powered equipment had problems of fluid spills and fluid leakage. Keeping an adequate supply of hydraulic fluid on hand was a limitation as well. In addition, halting a hydraulically driven rack's travel precisely was difficult to achieve, and the result was that substantial tolerances in the finished components were required. Also, because substantial mechanical movement was required for the rack, the speed of ejecting finished components was restricted.

Electric motors have been used in molding machine applications also. For example, U.S. Pat. No. 3,737,268, FIG. 12, illustrates the use of an electric motor for driving a shaft connected to a metal core with a threaded end inside a molded plastic component in order to turn and loosen the core and free it. In that patent, the core is moved rotationally by a belt-driven motor. A pair of ejector rods, powered by a second motor timed to cooperate with the first, are linearly moved to push the loosened component off the core.

Another patent illustrating the use of a pair of electric motors is U.S. Pat. No. 5,110,522. This patent relates particularly to an injection molding machine in which two motors are required for handling certain rectilinear and rotative drive requirements. Similarly, two motors are required for the rectilinear and rotative drives identified in U.S. Pat. Nos. 5,792,483 and 5,911,924.

U.S. Pat. No. 6,051,896 is an example of a patent which discloses the use of servo controlled electric motors in a molding machine. In that patent, one of the motors controls linear motion, and a second motor controls rotary motion. U.S. Pat. No. 6,142,760 is generally similar, as is U.S. Pat. No. 6,267,580.

SUMMARY OF THE INVENTION

The present invention incorporates a servo motor to drive one or more cores in an injection mold. In the new mold, the motor's engagement to one or more threaded end cores turns the cores at programmed speeds and at programmed torque to withdraw the cores from the components which have been molded around or into them. The motor continues to drive the cores in a programmed manner rectilinearly backwards and away from the mold cavities and from the components. Thereafter, as the mold is opened, the components are ejected, usually by pushing them out of the mold. To repeat the operation, the motor is reversed, and the threaded ends of the cores are moved back into their original positions in the cavities to be immersed again in or filled with plasticized molding material, depending upon whether the components being molded are internally or externally threaded.

Accordingly, in its first embodiment described below, this invention is incorporated in a mold assembly for forming a continuous internal thread inside a molded plastic element. A recess in a plastic injection mold, defined by internal walls inside the mold, forms the shape of the plastic article which one desires to make in the molding process. An end cap for a pipe is an example. A core is utilized which has a body portion with an externally threaded segment extending into the recess defined by the internal walls of the mold. The core also has a drive segment on the body portion spaced apart from the threaded segment. A drive member which has a drive portion complementary to and engaged upon the drive segment on the core is connected to a programmable electric motor. The motor is arranged to move the drive member programmed distances at programmed speeds. When the motor is activated, the drive portion on the drive member and the drive segment on the core cooperatively move the core through sufficient revolutions with any desired variations in speed to disengage the threaded segment from the plastic article within the recess by the end of the molding interval.

In an alternative embodiment, largely duplicative of the first embodiment just described, the body portion of a core has a segment having an aperture or pocket which is internally threaded extending into the cavity defined by the internal walls of the mold. A molded plastic component formed on such a segment of a core has external threads arranged on the outside of the component.

From the foregoing, and from what follows, it will be apparent that the present invention achieves numerous advantages over the molding processes and equipment which preceded it.

It is an object of the present invention to provide a mold assembly for producing internally or externally threaded plastic components which have very exact tolerances with rapidly repeatable precision.

It is also an object of the present invention to provide a mold assembly for producing internally or externally threaded components with threaded segments substantially longer than those which were obtainable with rack-driven cores.

It is also an object of the present invention to provide a mold assembly for producing an internally or externally threaded component which controls the rotary distance traveled by a core used in the molding process, the various speeds to be accomplished by the core, and the linear distances to be traveled by the core.

It is also an object of the present invention to provide a mold assembly for producing an internally or externally threaded component in which only one servo controlled electric motor is needed for both rotational and linear movement of a core.

It is also an object of the present invention to provide a mold assembly for simultaneously producing numerous internally or externally threaded components during the same molding interval utilizing several cores connected to the same servo controlled electric motor.

It is also an object of the present invention to provide a mold assembly for producing internally or externally threaded components having very exact tolerances in substantial quantities in a compact portion of the production space which is available.

It is also an object of the present invention to provide a mold assembly for producing internally or externally threaded components which does not utilize hydraulic fluids.

Other objects and advantages of the invention will be apparent to those skilled in the art of designing and using molds for threaded plastic parts from an examination of the following detailed description of preferred embodiments of the invention and of the accompanying drawings.

BRIEF DESCRIPTION OF THE DRAWINGS

FIG. 1 is a perspective view of part of a mold assembly embodying the present invention showing an electrical control component with its front cover panel partially open and cable connections arranged to extend from the component to the mold, and also showing a motor-carrying half of the mold with its inner face exposed and turned upwardly;

DESCRIPTION OF THE PREFERRED EMBODIMENTS

The preferred embodiments of this invention shown in the accompanying drawings will now be described, it being understood that the preferred forms are illustrative and that the invention described herein is embodied in the claims which are appended hereto.

Figure 1:
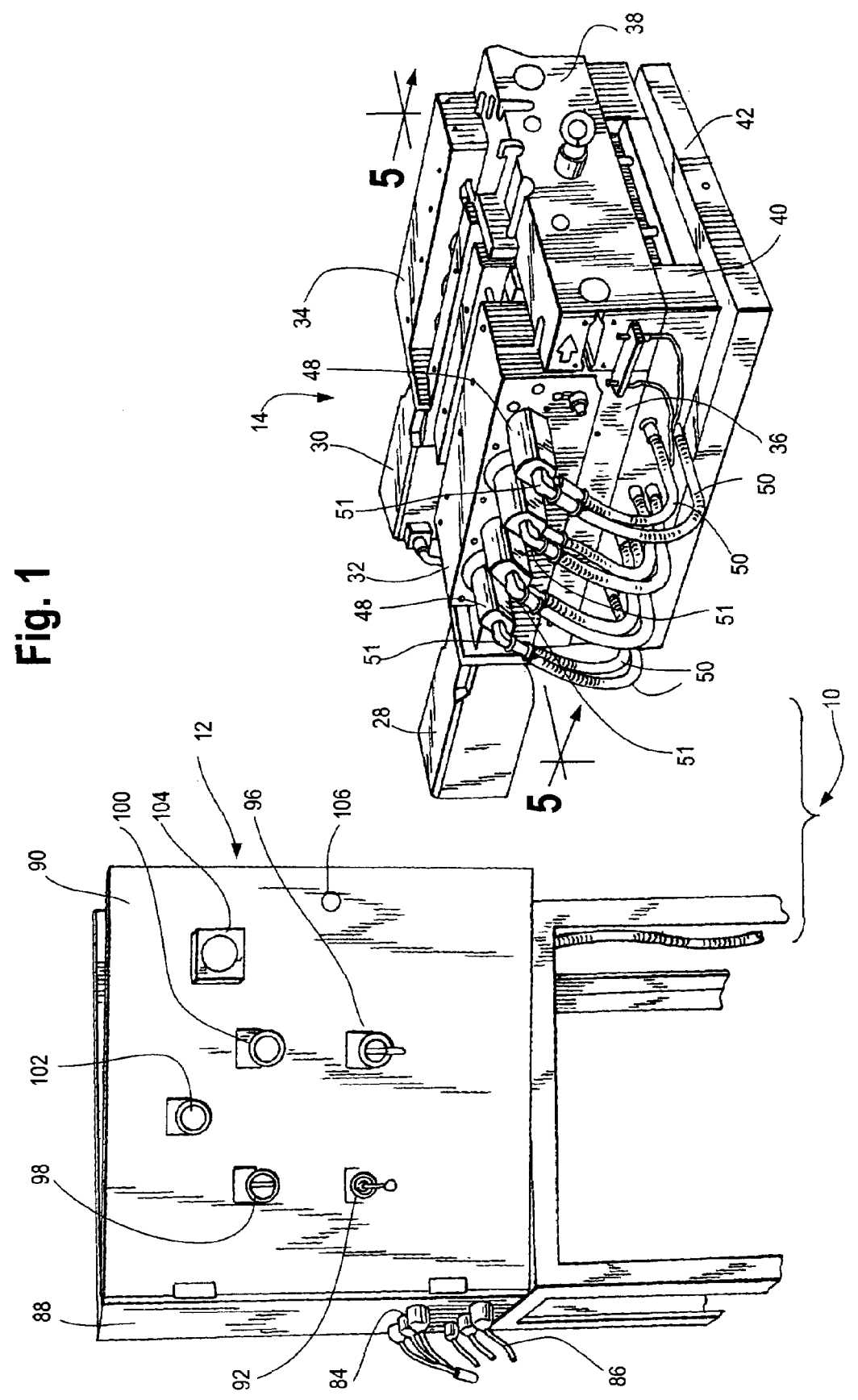
Figure 3:
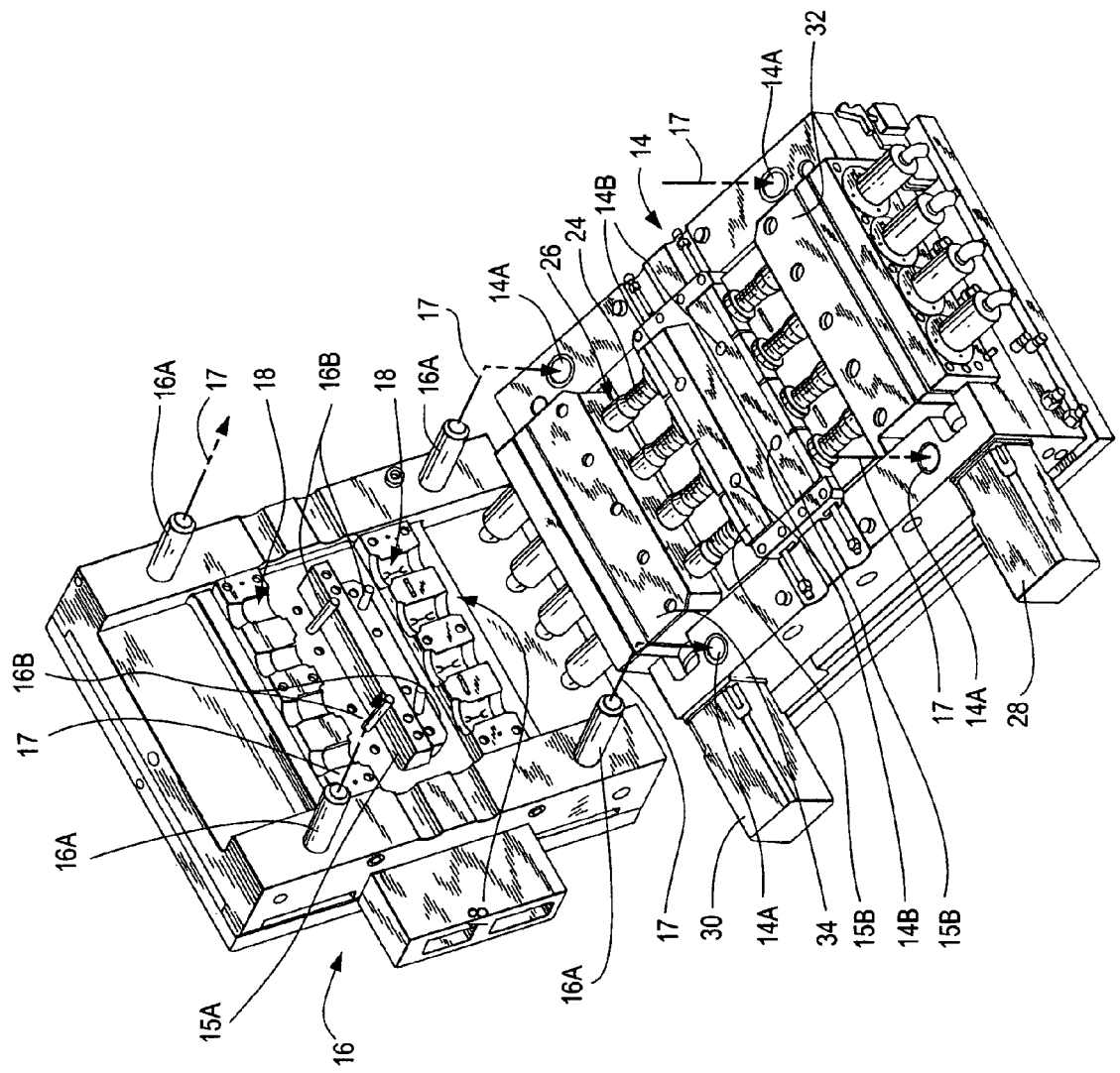
FIG. 3 is a perspective view of the motor-carrying mold half shown in FIG. 1 and also including a perspective view of a second mold half complementary to and aligned for mating engagement with the motor-carrying half of the mold.
Figure 5:
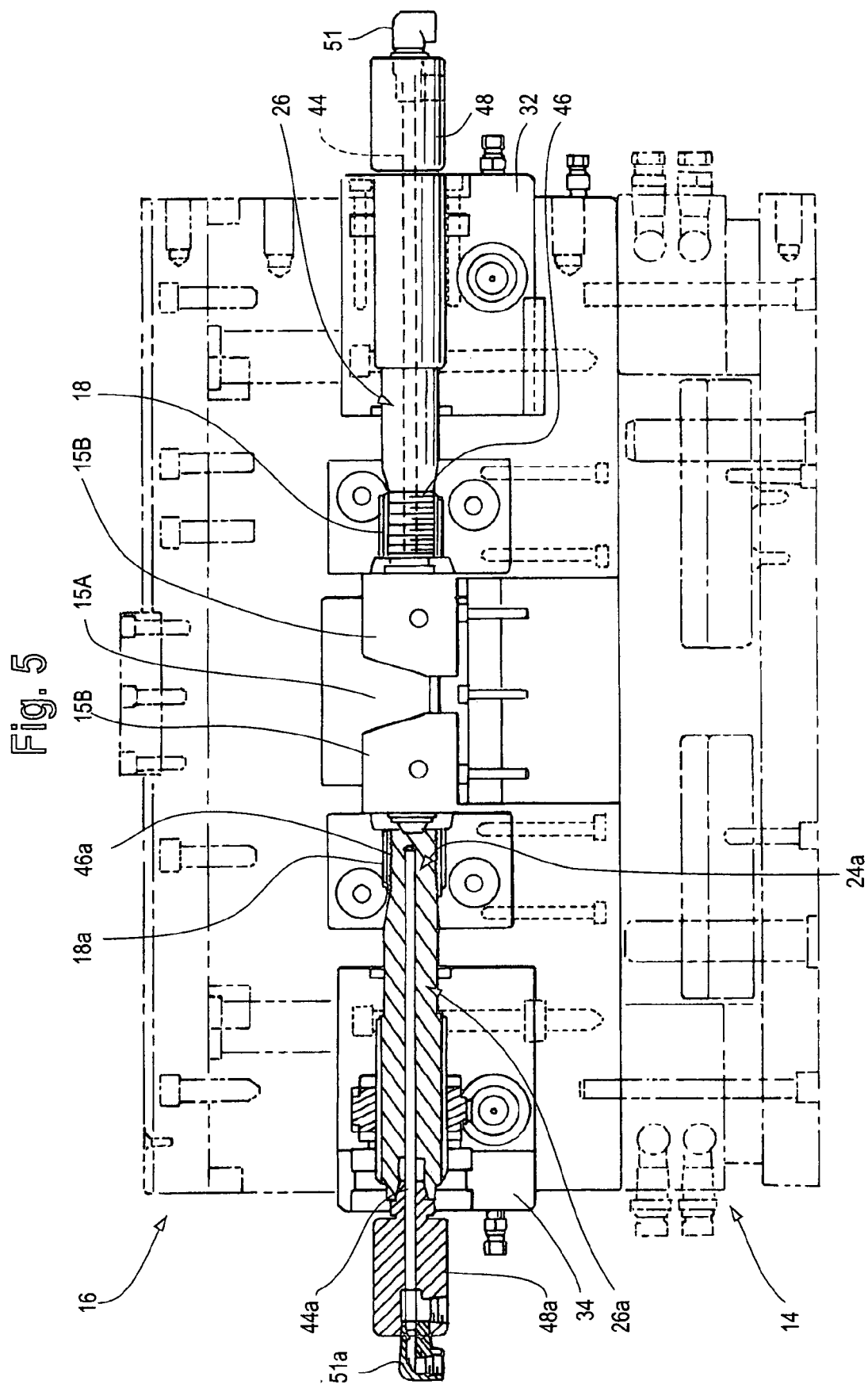
FIG. 5 is an elevational sectional view of the mold halves shown in FIG. 3 in assembled, mating engagement taken in the direction of and also along the line of arrows 5-5 shown in FIGS. 1 and 4.
Figure 11:
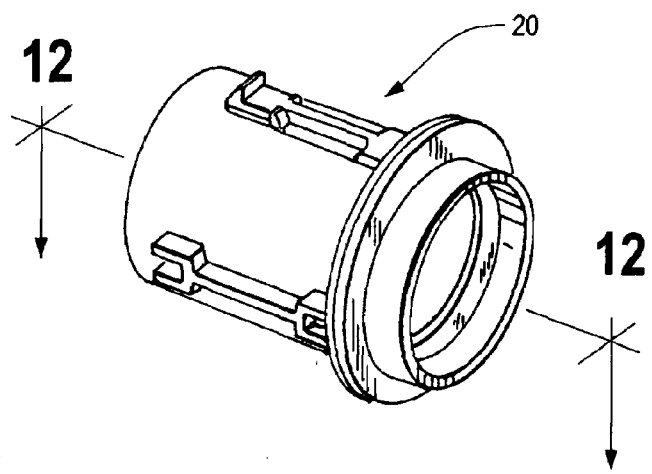
FIG. 11 is an enlarged perspective view of an internally threaded plastic component molded on the assembly shown in FIGS. 1 through 10.
Figure 12:
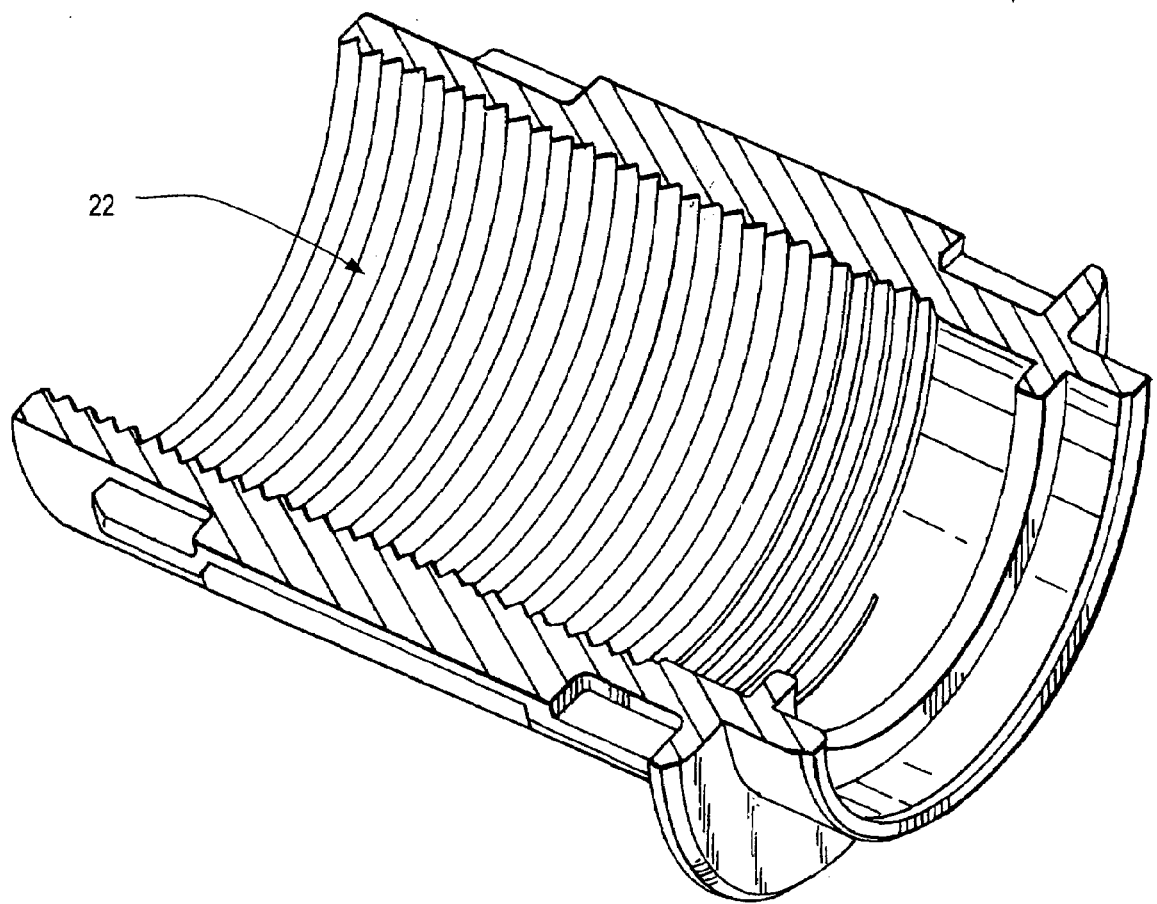
FIG. 12 is an enlarged perspective view, partly broken away, of the component shown in FIG. 11, taken along line 12-12 in FIG. 11.

One embodiment of this invention is the mold assembly 10 which is particularly depicted in FIGS. 1 and 3. The assembly includes a controls component 12 and a mold, one half of which is the motor-carrying mold half 14, and the other half of which is the complementary mold half 16 (See FIG. 3). The latter is configured to sealingly engage the motor-carrying mold half 14 (See FIG. 5) in order to form one or more cavities 18 and 18a inside the mold in which plastic articles such as the fitting 20 (See FIGS. 11 and 12) may be formed. In the embodiment of the mold assembly shown in FIGS. 1 and 3, the outer configuration of a molded fitting, such as the fitting 20 in FIGS. 11 and 12, depends upon the shape of the cavity 18. The inner configuration, namely, the internally threaded portion 22 of the fitting 20, depends upon the outwardly facing threaded surface 46 of the end segment 24 (or 24a shown in FIG. 5) of a cylindrically shaped metal core 26 around which the molten plastic from which the fitting 20 is made is formed.

Alignment of the mold halves 14 and 16 as they are engaged upon each other, in order to form the cavities 18 and 18a, is achieved by lodging engagement rods 16A (on the mold half 16) in sockets 14A in the motor-carrying mold half 14, as shown by arrows 17 in FIG. 3. Such alignment is assured further by engaging male wedge member 15A in female wedge members 15B on the mold halves 14 and 16, respectively, accompanied by engagement of pins 16B on the mold half 16 in sockets 14B in the motor-carrying mold half 14.

As shown in FIG. 1, the motor-carrying mold half 14 has two motors, 28 and 30. Each motor is similarly arranged so that each one is connected to and operates a set of four cores, as will shortly be explained in detail. The motors 28 and 30 are connected to their sets of cores in gear boxes 32 and 34, respectively. The gear boxes 32 and 34 are mounted in mold frame members such as 36 and 38. The frame members are, in turn, mounted on support rails such as are shown at 40 in FIG. 1, and those rails are attached to a clamp plate such as is shown at 42 in FIG. 1. The clamp plate is normally attached to a platen in a molding machine, neither one of which is shown here since such molding machine configurations, and how to operate them, are well known.

Injection molding machines are designed to hold various molds, and also to open and close the mold halves. When the halves are closed, molten plastic materials are injected into cavities inside the molds so that the shape of the walls of the cavities, as well as any other formative shapes inside the cavities, can be transferred to the plastic material while it is in its liquid state. After the molten plastic material has been cooled and has frozen into the shape of the cavity walls and of the other shaping forms inside the cavities, the molding machines open and separate the mold halves so that the elements formed by the molten plastic can be removed or ejected from the mold. Usually the mold halves are arranged so that the separation plane between the halves is substantially vertical. Then, when the halves are separated, the plastic elements can easily drop into a bin below the mold when they are ejected from the mold cavities.

Accordingly, with respect to FIG. 1, it will be understood that a molding machine (not shown) operates a platen holding mold half 14 and another platen holding mold half 16. The halves are moved apart when a cycle of the molding process for creating fittings 20 has been completed, and the fittings gathered from a bin or other receptacle into which they have been ejected. Thereafter, as further fittings are needed, the halves of the mold are moved together, closing the cavities so that molten plastic may be injected into them.

Figure 4:
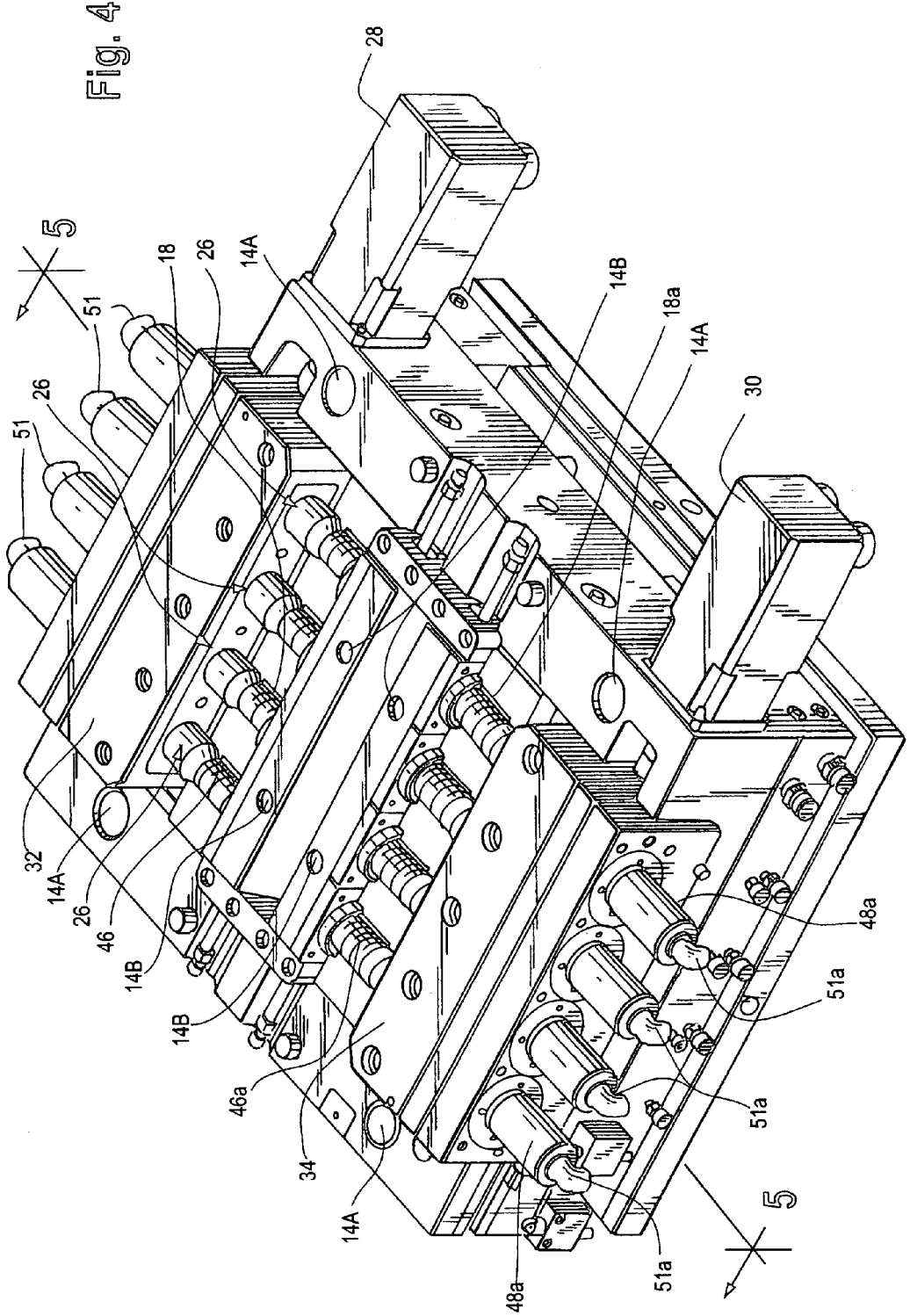
FIG. 4 is a perspective view of the motor-carrying half of the mold shown in FIG. 1 rotated approximately 180 degrees in the direction of arrow 4 in FIG. 1.

The cores 26 and 26a are identical. Each core has an end segment 46 which extends into a molding cavity such as 18 or 18a (See FIGS. 3, 4, and 5). Inside each core a water-cooling tube 44 extends axially to carry cooling water into the end segments 46 of the cores at appropriate intervals during the molding interval when it is desired to cool the molten plastic which has flowed around the segments 46. The tubes 44 are connected to unions 48 which carry cooling water from hoses 50. Notably, the unions 48, while stationary themselves, permit the tubes 44 connected to them in junctions such as 51 adjacent motor 28 to rotate around their longitudinal axes inside the cores so that the cores 26 which contain them can be rotated too. Tubes 44a, unions 48a and junctions 51a adjacent motor 30 (See FIGS. 4 and 5) are identically constructed and perform the same way as tubes 44, unions 48 and junctions 51, respectively.

Figure 6:
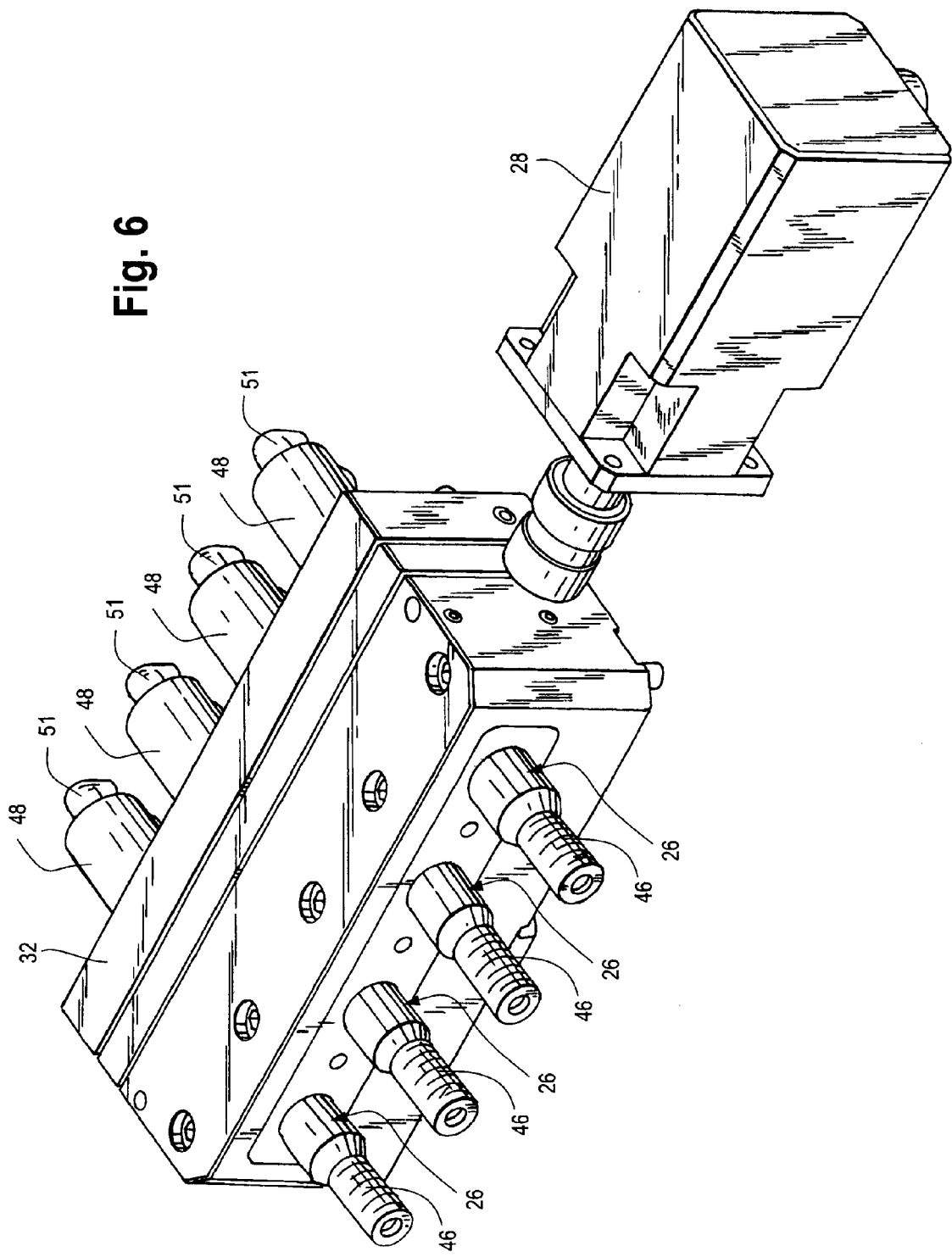
FIG. 6 is an enlarged perspective view isolating some of the elements of the motor-carrying mold half shown in FIG. 1.
Figure 7:
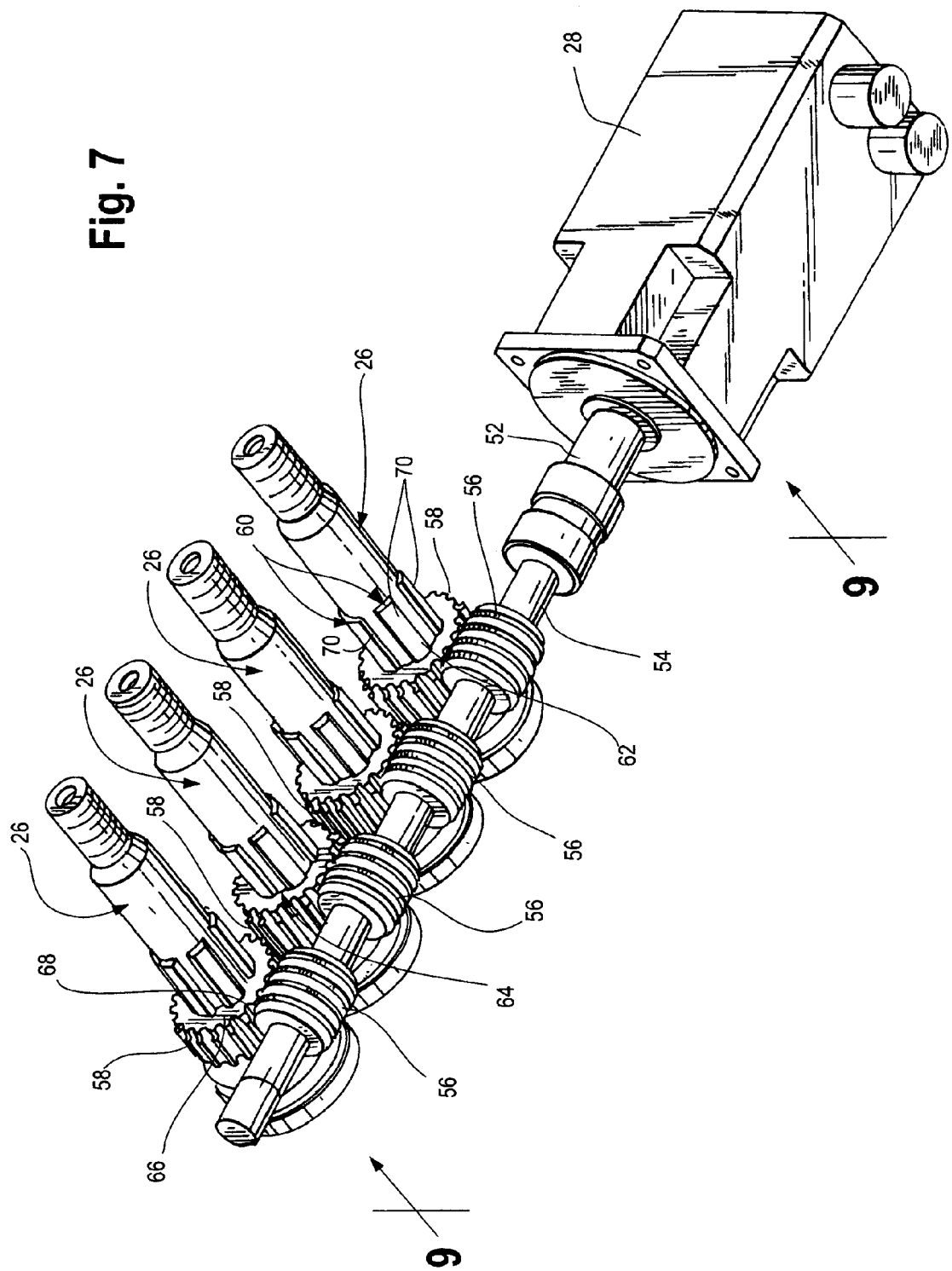
FIG. 7 is a perspective view isolating some of the elements of the motor-carrying mold half shown in FIG. 6.
Figure 8:
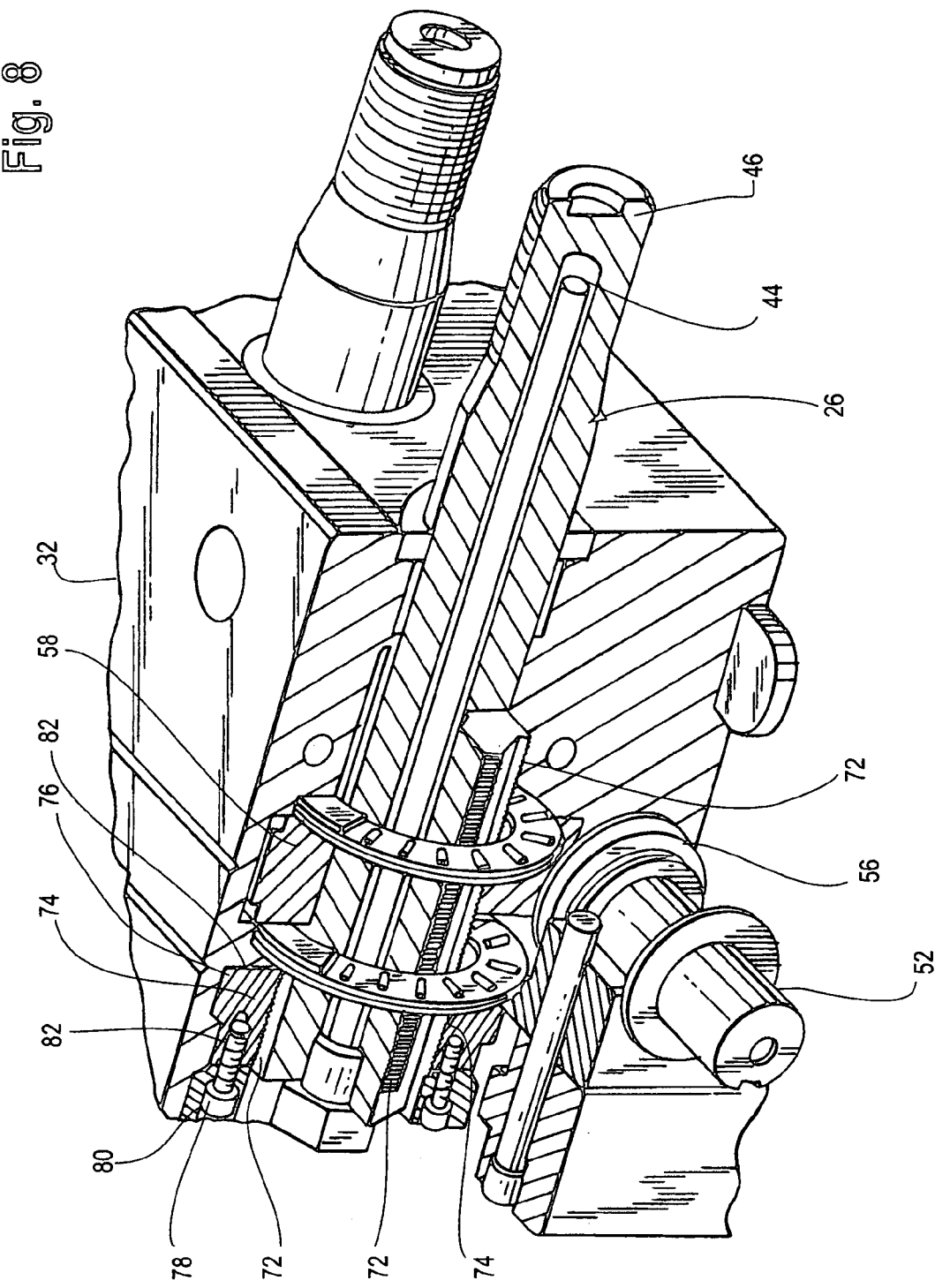
FIG. 8 is a perspective view, partly broken away, of an enlarged portion of some of the elements shown in FIG. 7 in assembled relation with elements of the mold half shown in FIG. 1.

Each of the motors 28 and 30 may be connected to a set of four cores, such as illustrated in FIGS. 6, 7, and 8, or to more or less than that number, depending upon a variety of considerations such as the size of the motor, the type of molding material which is being used, and other molding parameters. As shown particularly in FIG. 6, the motor 28 is connected to the four cores 26 inside a gear box 32.

FIG. 7 shows the internal arrangement of gear box 32 and how the cores 26 are connected to the motor 28. The drive shaft 52 of the motor is connected to a worm gear shaft 54 that carries a worm gear 56 for each core 26. On each core there is a worm wheel 58 forming part of a drive segment of core 26 which the worm gear 54 is engaged upon and drives. As detailed in FIG. 7, for example, each worm wheel 58 is connected to the core 26 which it is engaged upon by splines 60 arranged about the outside surfaces of the core 26. The splines are cooperatively engaged between and against the walls 62 of an aperture 64 formed in the center of worm wheel 58. The walls 62 forming the aperture 64 have land portions 66 and groove portions 68 which correspond to and matingly engage the outer configuration of the splines 60 and adjacent surfaces of core 26. When the worm gear is activated and driven by motor 28, worm wheel 58 is rotated by the worm gear, thus moving the walls 62 of the worm wheel and causing the core 26 to rotate. When there are a number of worm gears and corresponding cores, the cores are rotated in unison in response to the rotation of the worm gears by the motor.

The splines 60 may be machined on one end of the generally cylindrical steel body of a core 26 to form, along with the worm wheel, a drive segment of the core body. Alternatively, the splines 60 may be made separately and fastened in place on the core body by appropriately sized bolts or screws (not shown).

Figure 9:
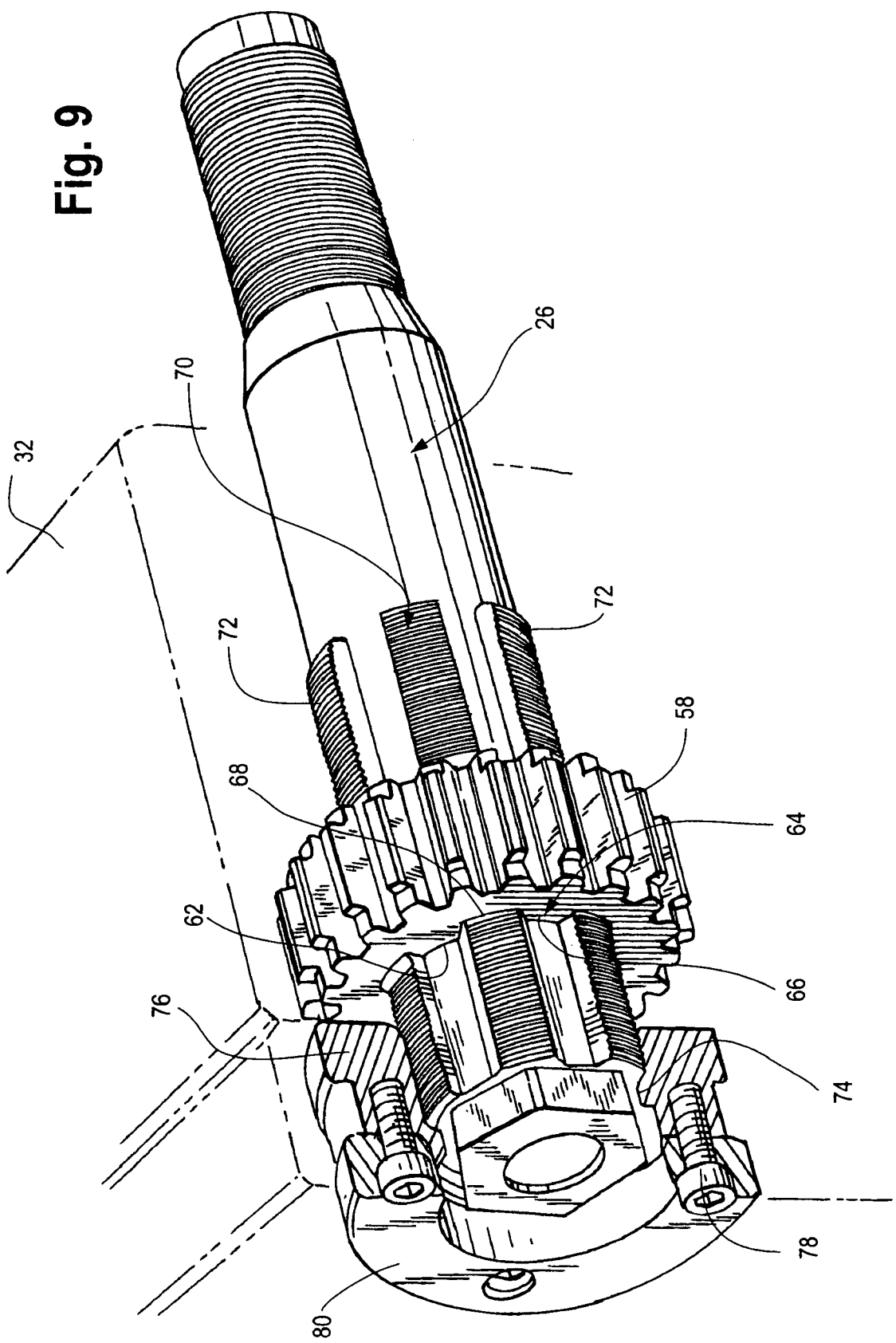
FIG. 9 is a perspective view, partly broken away, of an enlarged portion of some of the elements of the motor-carrying mold half shown in FIG. 7 taken in the direction of arrow 9 in FIG. 7.

The radially outwardly facing surfaces 70 of the splines 60 are provided with threads 72 which are cooperatively engaged in threads 74 disposed in a wall of the gear box in which the core 26 is mounted. In the embodiment illustrated (See FIGS. 8 and 9) the threads 74 are arranged inside a ring 76 that is fastened with cap screws 78 and a locking ring 80 into a socket 82 formed in a wall of gear box 32. The ring 76 is situated adjacent the drive segment of core 26 carrying the worm wheel 58. Splines 60 and the adjacent surfaces of core 26 move slidably past the land portions 66 and groove portions 68 of aperture 64 in the center of worm wheel 58 when the core 26 is rotated, driven by motor 28 and directed by the cooperative engagement of threads 72 and 74. Accordingly, as the core 26 is moved in a rotating manner by motor 28, and the segment 46 of the core 26 is moved for any rotational distance, core 26 is simultaneously moved along the threads 72 and 74 by motor 28 in a linear direction.

Motor 28 may be programmed to change from one rate of speed to another during the linear and rotational movement of core 26, and from one rate of torque to another, with corresponding changes to the linear and rotational responses in core 26. Thus, when it is desired to turn the core 26 with high torque and low speed, or intermittently, as when loosening and unscrewing the core from inside a hardened plastic article being molded (such as fitting 20), the motor may be directed by a program to operate in that manner. After the core has been loosened from the inside of the article, and it is desired to move the core 26 out of and away from the plastic article more rapidly in a linear direction, the motor 28 can be programmed to adopt a new speed and torque. The change may be made, if desired, without interrupting the continuous rotation of the core. In this assembly, the movements of the core are very precisely controlled, both linearly and rotationally, so that core movements can be limited to specified thousandths of an inch.

It will be apparent immediately to those skilled in the art of designing mold assemblies of this general type that the distance which a rack would have to travel, in a straight line pathway away from the mold, in order to equal the rotational distance traveled by a given point on the threads 72 and accomplish a specified number of rotations of core 26 would require a lengthy open space or vacant runway in a molder's plant. Such movement of a rack is not practical, even if it were possible, when a substantial number of threads are desired inside a molded plastic component which would require a large number of core rotations in order to back out of the component. In the present invention, using the motor-driven threaded splines the core can be rotated many times without taking up plant space, and consequently a longer threaded segment at the end of the core can be employed, resulting in more threads and longer threaded portions in the plastic articles being molded.

Figure 2:
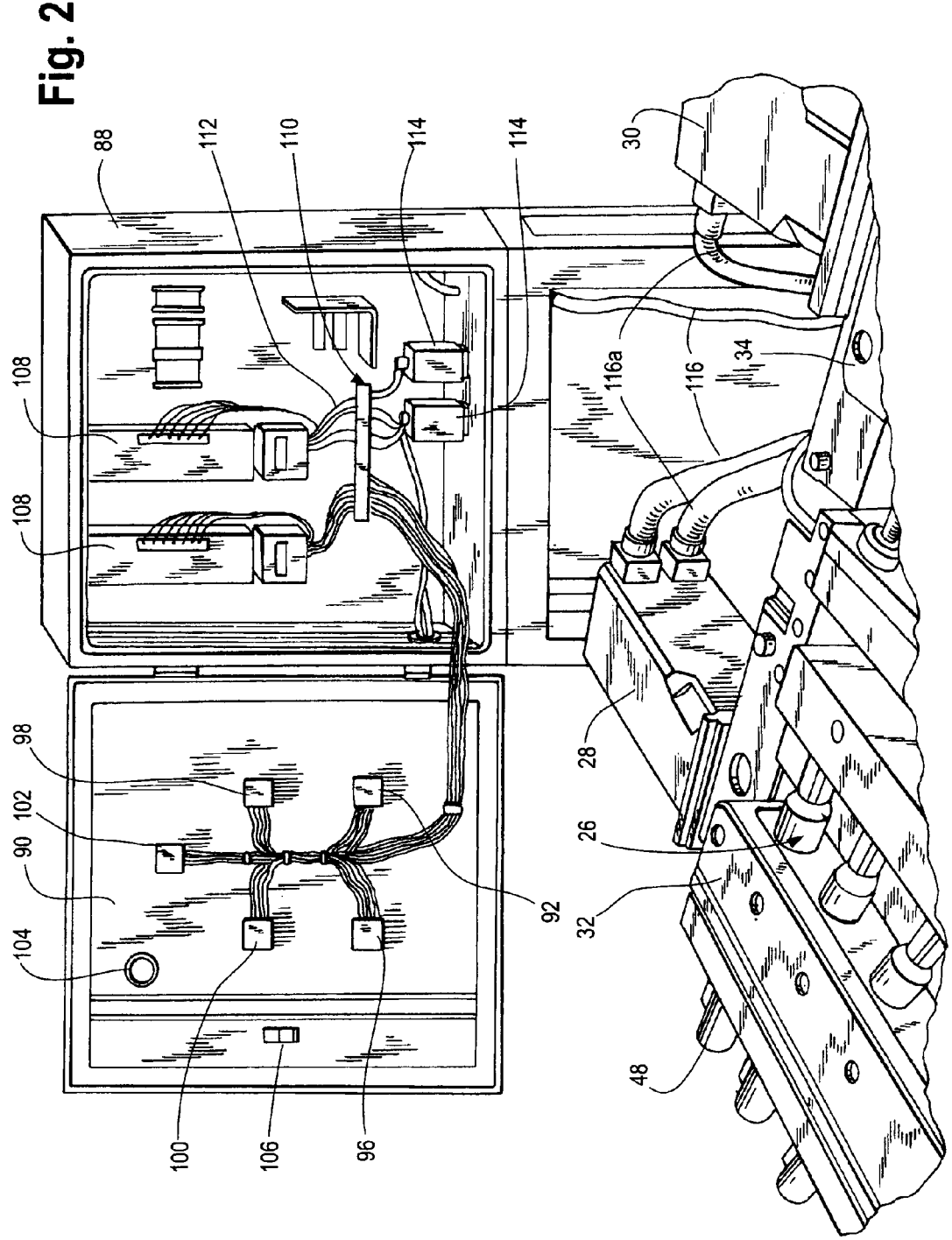
FIG. 2 is a perspective view of an enlarged portion of the mold assembly shown in FIG. 1 showing the control box door fully open.
Figure 14:
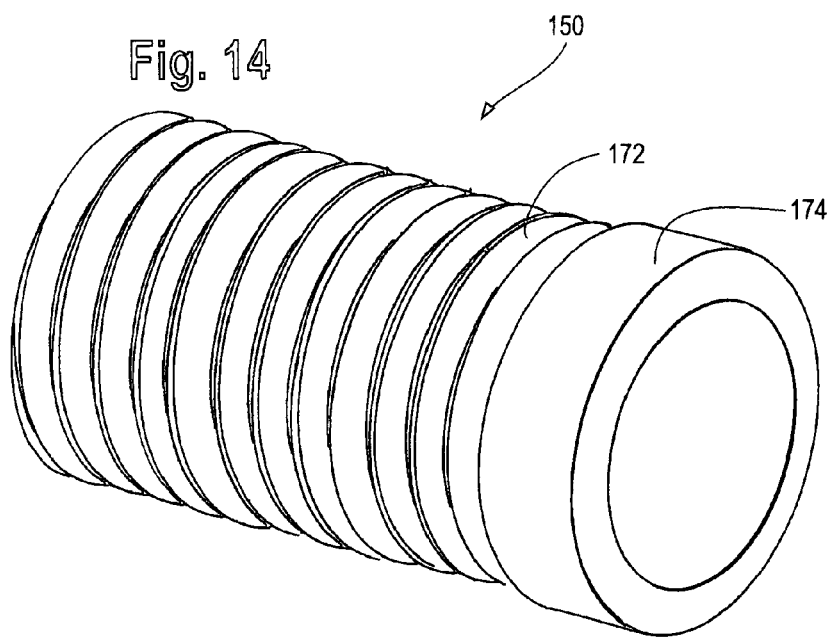
FIG. 14 is an enlarged perspective view of an externally threaded component molded on the element shown in FIG. 13.

The over-all assembly 10 of the present invention is substantially illustrated in FIGS. 1 and 2. The motor-carrying half 14 of the mold has also been described with particularity above. In the embodiment referred to, the cores 26 include an externally threaded end portion 24 for forming an internally threaded component such as the component 20 shown in FIGS. 11 and 12. The present invention is also adapted to produce an externally threaded component such as the component 150 shown in FIG. 14.

Figure 13:
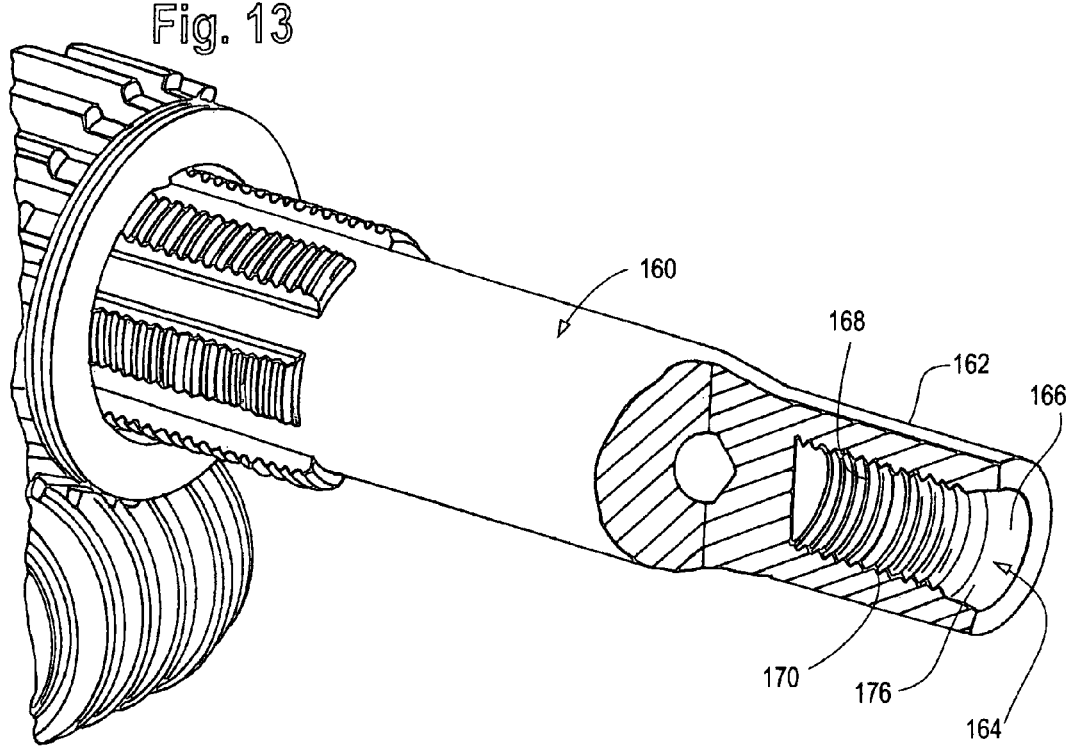
FIG. 13 is a perspective view, partly broken away, of an alternative form of the partially broken away element shown in FIG. 8.

A core 160 is illustrated in FIG. 13 for forming component 150. The core 160 is rotated and linearly moved in a manner and by a physical arrangement identical to the manner and physical arrangement for simultaneously moving core 26 rotationally and linearly. However, the end portion of core 160 which extends into a mold cavity such as cavities 18 and 18a is provided with a central aperture 164 arranged longitudinally along axis 166 and extending into the end portion 162 of core 160. The walls 168 of the aperture 164 are provided with a thread-forming helical groove 170 for forming an external arrangement 172 of threads on the outside of component 150. If an area without threads is desired, such as segment 174 on the end of component 150 which might be used as a cap on the finished component, a portion of the walls 168 (such as the end portion 176) is not formed with a helical groove 170.

Turning now to a particular description of the assembly controls which may be used with cores formed like core 26 or like core 160, it may be noted that the motors 28 and 30 (See FIG. 1) are connected by cables 84 to the controls component 12. Component 12 is powered from any convenient source (See FIG. 6, for example) through cable 86. In the component 12 which is illustrated, a box 88 contains the electrical controls for the mold. A door 90 hinged to the box 88 carries a variety of switches for the component 12. The illustrated arrangement of the contents of box 88 may be rearranged in any order or container. For example, control component 12 could be integrated into the molding machine. However it is collected and assembled, preferably it includes the following elements.

There is a motor selector switch 92 which singles out which motor on the mold is to be activated, or it may also be used to designate which combination of motors to activate. The mold illustrated here only includes the two motors 28 and 30, but it will be recognized that further motors and the cores associated with them in the manner described above may be used without departing from the scope of this invention. Switch 94 is the on/off switch to the motors.

Motors 28 and 30 are reversible motors. When one or the other or both of them are driven in one direction to a maximum "in" position, they position the threaded segment ends of the cores which they respectively control, through the drive shaft, worm and worm wheel rotation, in a maximum "in" position within the cores' respective mold cavities. Similarly, when the selected motors are driven in the opposite direction to a maximum "out" position, they put the ends of the cores adjacent the splines 60, through drive shaft, worm gear and worm wheel rotation in the opposite direction, in a maximum withdrawal position from the cores' respective mold cavities. A positioning switch 96 directs the selected motors to locate their respective cores at any desired position between maximum "in" and maximum "out." Switch 98 may be set to always return the cores to a "home" position (usually maximum "in") so that they begin each molding cycle at a preselected starting point and produce a series of products, such as fitting 20, having very uniform specifications.

A fourth switch, numbered 100 and located on door 90, is provided to turn the selected motors on or off, and an indicator light 102 is provided to let an operator know that the core controls have or have not been activated. The master on/off switch to the control component 12 is shown at 104. Cabinet door 90 is usually latched or locked in a closed position by a lock or handle 106.

FIG. 2 illustrates the inside of the controls component 12. Housed in the cabinet side of control box 88 are amplifiers 108 and 108a which contain program modules controlling the movements of the cores. In particular, amplifier 108 controls motor 28, and amplifier 108a controls motor 30. The program modules 109 (for amplifier 108) and 109 (for amplifier 108a) hold and transmit the programs for the motors, i.e., starting, stopping, changing speeds at specified times and intervals, and similar motor movements pursuant to programmed commands. These, in turn, control the movements of the cores, including their disposition on or adjacent to the components which are being molded. A terminal strip 110 distributes the electrical commands of the programs from the program modules 109 and 109a and amplifiers 108 and 108a to signal delay timers 114. The timers 114 are also connected to the molding machine servicing the mold halves 14 and 16, and they regulate signals from the amplifiers for the motors to stop, start or otherwise move the cores according to programmed commands. Electrical signals to the motors 28 and 30 are carried from the control component 12 through motor cables 116 and 116a.

Figure 10:
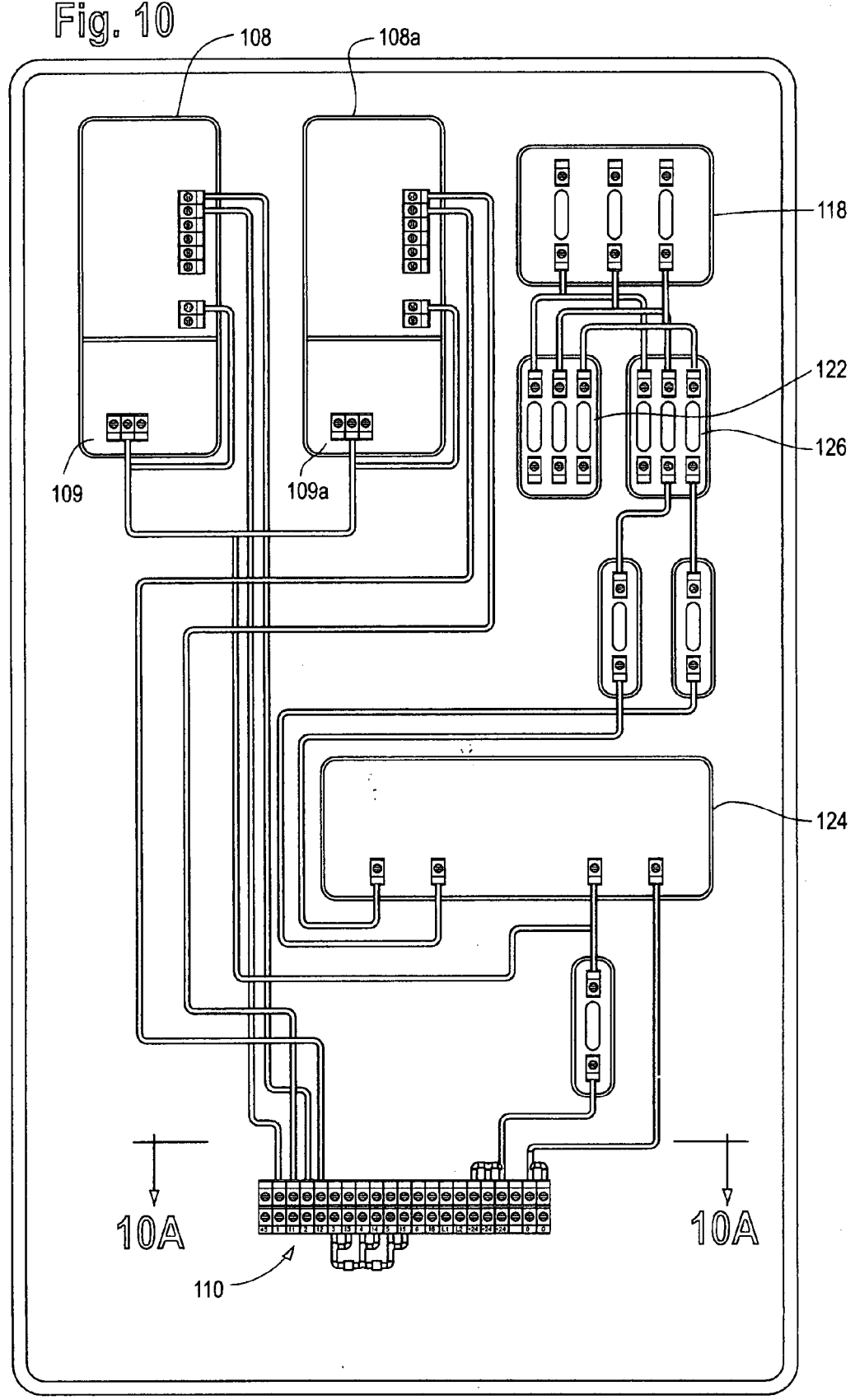
FIG. 10 is a diagrammatic layout of the electrical control component of the mold assembly shown in FIG. 1.
Figure 10A:
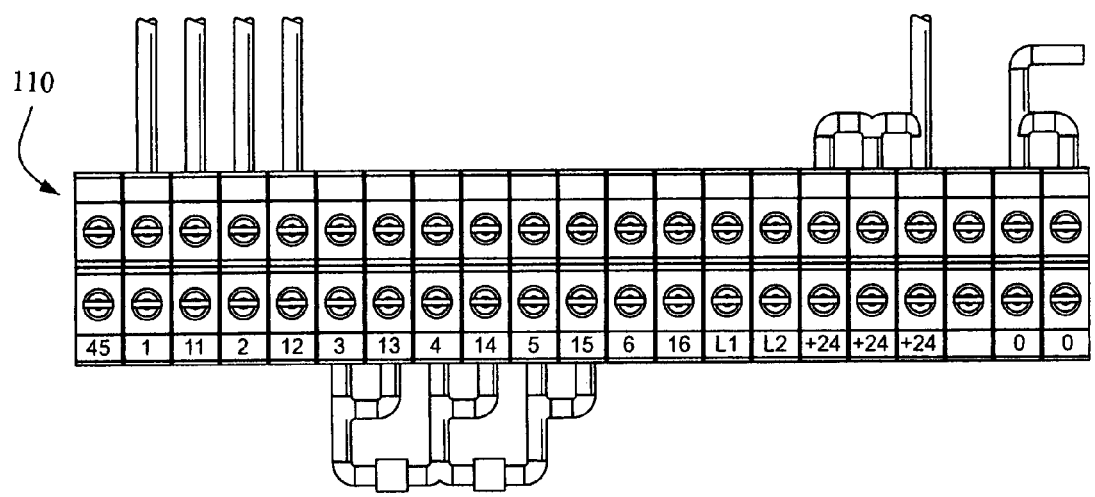
FIG. 10A is an enlarged portion of the electrical layout shown in FIG. 10 taken along the line 10A-10A in FIG. 10.

A diagrammatic layout of the contents of the control component 12 is shown in FIGS. 10 and 10A. The motors 28 and 30 are supplied from a 240 volt three phase line brought to the site and into the box 88 through cable 86. In FIG. 10, the main power input, which is fused, is shown at 118. From the main input 118, power is supplied to the control functions 108 and 109, and their counterparts, for motors 28 and 30, respectively, through fused interconnects 120 (to motor 30) and 122 (to motor 28), through a 24 volt power supply 124, and through terminal strip 110. The connections for motor 28 duplicate those for motor 30 and are not shown in FIG. 10 simply for the purpose of avoiding visual confusion. The terminal strip 110 is primarily an organizing element to keep order among and to follow the conductors inside control component 12. Such a strip may be as long as the unit shown in FIGS. 10 and 10A, or longer or shorter, depending mainly upon the number of motors utilized in the mold. The several inputs on the terminal strip 110 to motor 28 are shown as switches in FIG. 10A numbered 1,2,3,4,5 and 6, and the inputs on the terminal strip 110 to motor 30 are shown as switches numbered 11, 12, 13, 14, 15 and 16. The power-on light for motor 28 is shown as L1 in FIG. 10A, and the power-on light for motor 30 is shown in that Figure as L2. A drive selector is shown as switch 45, and the switches connecting the internal power supply to the molding machine are designated +24. Power for the various control functions is supplied through switches numbered 0 at the right end of terminal strip 110 in FIG. 10A. The motors 28 and 30 may be selectively operated to stop, start, move to a "home" position and may be operated to withdraw the threaded molding segments of the core members at various speeds partially or completely from their respective molding chambers utilizing the channels of power connections established through the terminal strip.

It is evident from the foregoing disclosure that even though particular forms of the invention have been illustrated and described, still, various modifications can be made without departing from the true spirit and scope of the invention. Accordingly, no limitations on the invention are intended by the foregoing description of its preferred embodiments, and its scope is covered by the following claims.

We claim:

1. A mold assembly comprising
   an injection mold having
      a molding chamber for receiving and forming a molded plastic component from a predetermined amount of flowing molding material during a molding cycle, and
      a channel in the mold leading to the molding chamber,
   a core member disposed in an rotatably and longitudinally moveable along the channel, and including
      a threaded molding segment adjacent one end for forming the molding material in the chamber during the molding cycle, and
      a drive segment having
         a core rotary movement member and
         a core linear movement member connected to the core rotary movement member, and
   a programmable servo motor powered drive member connected by non-hydraulic members to the core rotary movement member for simultaneously moving the core rotary movement member and the core linear movement member and positioning the molding segment adjacent the end of the core member in or out of the molding chamber without utilizing hydraulic fluids, the core member being rotated and moved longitudinally at different speed and at different torque levels by a program applied to the servo motor while the molding segment of the core member is being moved out of the molded plastic component in the molding chamber.

2. The mold assembly of claim 1 in which the drive member is a worm gear and the core rotary movement is a worm wheel engaged on the worm gear.

3. The mold assembly of claim 1 in which the core member is a cylindrically shaped bar having the molding segment adjacent one end and the drive segment adjacent a second end and a longitudinal axis extending through the bar from end to end.

4. The mold assembly of claim 1 in which the molding segment of the core member includes a threaded area on the outside of the core member for forming internal threads on the inside of a component being molded in the molding chamber.

5. The mold assembly of claim 1 in which the molding segment of the core member includes a threaded surface area inside the one end of the core member for forming external threads on the outside of a component being molded in the molding chamber.

6. The mold assembly of claim 1 in which the core linear movement member includes an externally threaded element on the outer surface of the core containing threads arranged substantially normal to the longitudinal axis of the core and engageable by a complementary threaded element affixed to the mold and arranged about the drive segment to intersect the externally threaded element of the core linear movement member.

7. The mold assembly of claim 1 in which the core rotary movement member is a disk shaped element disposed around the core member in a plane substantially normal to the longitudinal axis of the core and the core linear movement member is engaged to the disk shaped element through a centrally located aperture in the disk shaped element.

8. The mold assembly of claim 1 in which the core linear movement member includes a projection extending radially from the core member slideably engaged upon walls of a central opening in the core rotary movement member to receive pressure from the core rotary movement member and rotate the core member about a longitudinal axis of the core member while simultaneously sliding the core member along the walls of the central opening in the core rotary movement member in a direction substantially normal to the direction of the pressure from the core rotary movement member.

9. The mold assembly of claim 8 in which the projection on the core linear movement member is a spine disposed on the outside of the core member and extending in a direction of the longitudinal axis of the core member.

* * * * *